(12) United States Patent
Paslier et al.

(10) Patent No.: US 11,479,375 B2
(45) Date of Patent: Oct. 25, 2022

(54) METHOD OF ENCAPSULATING LIQUID PRODUCTS

(71) Applicant: NOTPLA LIMITED, London (GB)

(72) Inventors: Pierre-Yves Paslier, London (GB); Rodrigo Garcia González, London (GB)

(73) Assignee: NOTPLA LIMITED, London (GB)

( * ) Notice: Subject to any disclaimer, the term of this patent is extended or adjusted under 35 U.S.C. 154(b) by 274 days.

(21) Appl. No.: 16/496,128

(22) PCT Filed: Mar. 22, 2018

(86) PCT No.: PCT/GB2018/050756
§ 371 (c)(1),
(2) Date: Sep. 20, 2019

(87) PCT Pub. No.: WO2018/172781
PCT Pub. Date: Sep. 27, 2018

(65) Prior Publication Data
US 2020/0047927 A1 Feb. 13, 2020

(30) Foreign Application Priority Data

Mar. 22, 2017 (GB) ..................................... 1704547

(51) Int. Cl.
*B65B 3/02* (2006.01)
*B65B 61/06* (2006.01)
(Continued)

(52) U.S. Cl.
CPC ................ *B65B 3/02* (2013.01); *A23P 20/10* (2016.08); *B65B 9/24* (2013.01); *B65B 61/06* (2013.01);
(Continued)

(58) Field of Classification Search
None
See application file for complete search history.

(56) References Cited

U.S. PATENT DOCUMENTS 4,183,964 A * 1/1980 Vinokur ................ A22C 11/10
138/118.1
4,303,711 A * 12/1981 Erk ..................... A22C 13/0013
428/34.8
(Continued)

FOREIGN PATENT DOCUMENTS

CN     103518819 B    4/2015
WO     WO-2002/015715 B1    7/2002
(Continued)

OTHER PUBLICATIONS

International Search Report and Written Opinion of the International Search Authority, PCT/GB2018/050756, dated Jun. 14, 2018.

*Primary Examiner* — Hemant Desai
*Assistant Examiner* — Tanzim Imam
(74) *Attorney, Agent, or Firm* — Schwegman Lundberg & Woessner, P.A.

(57) ABSTRACT

The invention relates to a method for encapsulating a liquid product, the method comprising blending together a solution of alginate and a thickener and extruding through an appropriately shaped die to form a membrane, applying a calcium rich ion solution to crosslink the membrane and create a water insoluble membrane, filling the water insoluble membrane with the liquid product; and sealing the membrane around the liquid product, encapsulating the liquid product therein.

17 Claims, 4 Drawing Sheets

(51) Int. Cl.
*B65B 9/24* (2006.01)
*B65D 65/46* (2006.01)
*A23P 20/10* (2016.01)

(52) U.S. Cl.
CPC ......... *B65D 65/463* (2013.01); *B65D 65/466* (2013.01)

(56) References Cited

U.S. PATENT DOCUMENTS

| | | | | |
|---|---|---|---|---|
| 4,784,862 | A * | 11/1988 | Wotherspoon | A23L 29/206 426/103 |
| 5,084,283 | A * | 1/1992 | Oxley | A22C 13/0003 426/105 |
| 7,323,202 | B2 * | 1/2008 | Goorhuis | A22C 13/0013 426/105 |
| 2002/0039615 | A1 * | 4/2002 | Adachi | A23F 3/163 426/573 |
| 2003/0072854 | A1 * | 4/2003 | Garcia Vizcarra | A22C 13/0013 426/135 |
| 2009/0317522 | A1 * | 12/2009 | Nielsen | A22C 13/0013 426/138 |
| 2015/0030775 | A1 * | 1/2015 | Edwards | A23P 20/17 427/333 |
| 2016/0045441 | A1 * | 2/2016 | Diederich | A61K 9/2893 424/482 |

FOREIGN PATENT DOCUMENTS

| | | | | |
|---|---|---|---|---|
| WO | WO-2011/103594 | A1 | 8/2011 | |
| WO | WO-2011103594 | A1 * | 8/2011 | ............. A23P 20/15 |

\* cited by examiner

METHOD OF ENCAPSULATING LIQUID PRODUCTS

CROSS REFERENCE TO RELATED APPLICATIONS

This application is a U.S. National Stage of International Application No. PCT/GB2018/050756, filed Mar. 22, 2018, which claims the benefit of United Kingdom Patent Application No. 1704547.7, filed Mar. 22, 2017, the entire contents of each of which are fully incorporated herein by reference.

TECHNICAL FIELD

The present invention relates a method or process of encapsulating liquids or liquid products into a cross-linked matrix for packaging applications. The method particularly concerns use of a water insoluble alginate membrane in such a method to obtain an encapsulated product suitable as water proof packaging.

BACKGROUND

Alginate is a water-soluble biopolymer that is extracted from brown seaweed. It is a valuable natural material which has a wide variety of practical applications in the biomedical and bioengineering fields; for example, bio-encapsulation (Klock, Pfeffermann et al. 1997, Becerra, Baroli et al. 2001, Milovanovic, Bozic et al. 2007), scaffolding for tissue engineering, delivery vehicles for drugs (Almeida and Almeida 2004), model extracellular matrices for basic biological studies (Augst, Kong et al. 2006), dental impression and denture adhesives (Ashley, McCullagh et al. 2005), wound care and dermatology (Matthew, Browne et al. 1995, FMC-BioPolymer 2003).

In particular, alginate hydrogel has several useful properties; its gelling, film-forming, thickening and stabilising characteristics (as well as inherent biodegradability and biocompatibility) make it an attractive material for application in the life sciences. Alginate films have been shown for example to be useful as membranes for separation processes (Hubble and Newman 1985, Julian, Radebaugh et al. 1988, Zhang and Franco 1999, Kanti, Srigowri et al. 2004, Toti and Aminabhavi 2004, Kashima and Imai 2012).

There has been some research on use of alginate in encapsulation. Studies (Dembczynski and Jankowski 2000, Bratthall, Lindberg et al. 2001, Almeida and Almeida 2004, Liew, Chan et al. 2006) have reported the use of alginate for encapsulation of drugs and food compounds (Nedovic, Kalusevic et al. 2011, Lupo, Maestro et al. 2015).

However, there is little specific research investigating its possible use to encapsulate larger volumes of liquid products, including water, for useful storage and transfer applications. Alginate has been used to encapsulate small volumes of liquid in culinary spherification techniques. However, these techniques suffer the drawback of not being scalable to larger volumes.

The enhancement and development of alginate properties, specifically its gelling, film-forming and stabilising characteristics alongside mechanical properties, are of great interest. As yet, such development has not been fully explored. To enable the diversification of its application, in particular to improve its ability for use in the encapsulation of liquids, with the propensity for minimal leakage would be very desirable.

The present invention has arisen from a desire to solve the technical problems that have not to date been addressed by the prior art. Further, such methods would be useful in providing a cost effective, environmentally sustainable solution for producing encapsulated packaging for liquid-based products, in order to improve waste management processes, in particular as an alternative to plastic cups, bottles and sachets which are large contributors to marine pollution.

SUMMARY OF THE INVENTION

The invention concerns a novel method for encapsulating a liquid, semi-liquid or powder product (e.g. a liquid product), the method comprising:
  blending together an alginate and a thickener and extruding through an appropriately shaped die to form a membrane;
  applying a calcium rich ion solution to crosslink the membrane and create a water insoluble membrane;
  filling the water insoluble membrane with the product (e.g. liquid product); and
  sealing the membrane around the liquid product, encapsulating the product (e.g. liquid product) therein.

BRIEF DESCRIPTION OF THE DRAWINGS

The invention is described with reference to the accompanying drawings in which.

DETAILED DESCRIPTION OF THE INVENTION

Figure 1:
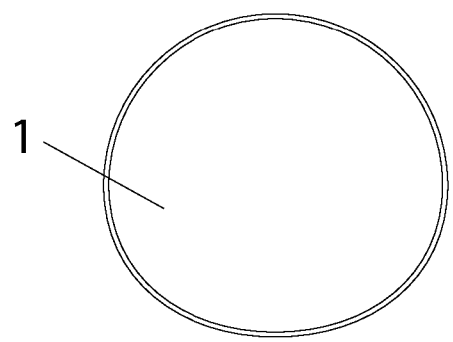
FIG. 1 shows a unit capsule comprising a cross-linked alginate membrane made by the method herein described. The inner liquid content is filled as provided in the process and could be any kind of liquid or colloid. The membrane is biodegradable and/or edible. The shape of the unit is spherical but typically defined in part by the internal pressure of the content.
Figure 2:
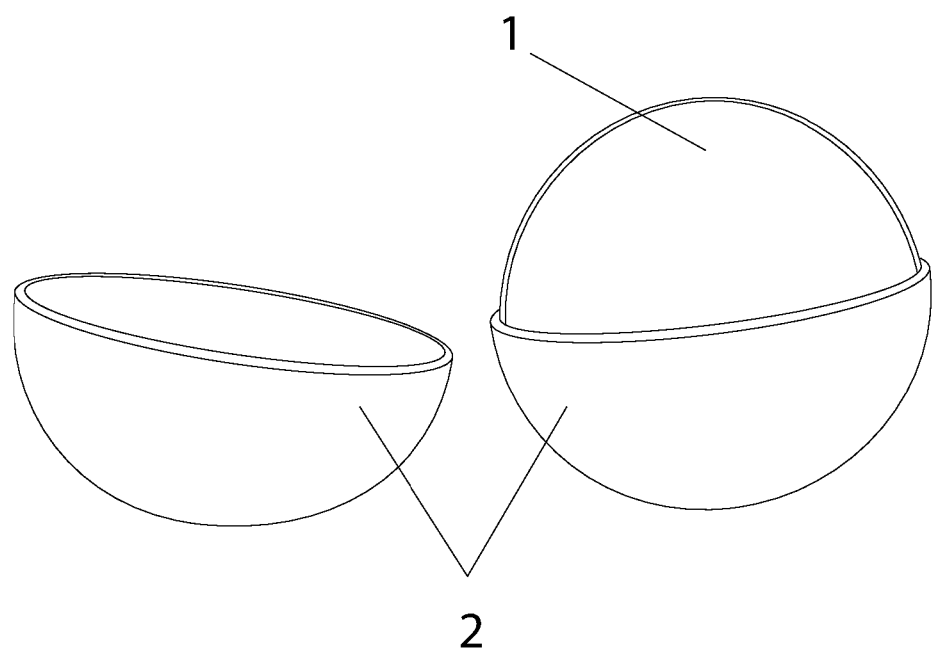
FIG. 2 shows a single unit capsule with a double membrane as made in accordance with some embodiments of the invention, wherein the creation of a double membrane improves mechanical resistance and hygiene properties of the capsule. Further, the first outer layer (1) is removable e.g. by peeling, it does not itself need to be edible. The internal content is protected by the secondary layer (2) that can also be peelable, if desired.
Figure 3:
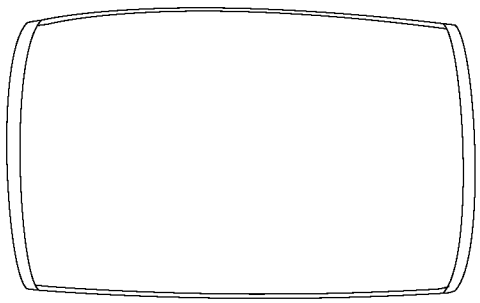
FIG. 3 shows an alternative shaped unit which has an extruded alginate membrane and is cross-linked and joined at parallel ends, made in accordance with the process in some embodiments of the invention.
Figure 4:
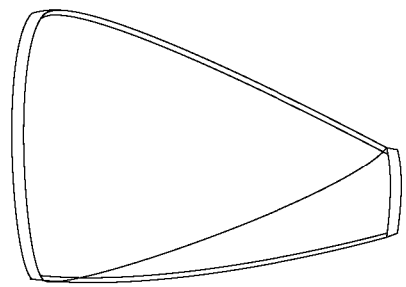
FIG. 4 shows a further alternative coextruded alginate membrane unit with cross-linked joins in a non-parallel configuration, which may be made in accordance with an embodiment of the invention.
Figure 5:
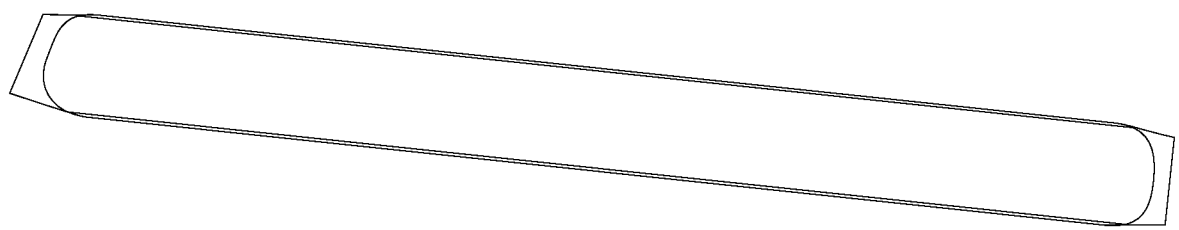
FIG. 5 shows different longer version of the alginate membrane shown in FIG. 4.
Figure 6:
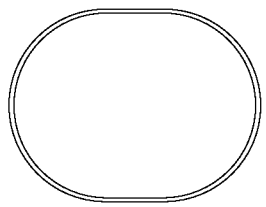
FIGS. 6, 7 and 8 shows alternative versions filled, coextruded alginate membrane having different proportions and a seamless cross linked join, which may be made in accordance with an embodiment of the invention.
Figure 7:
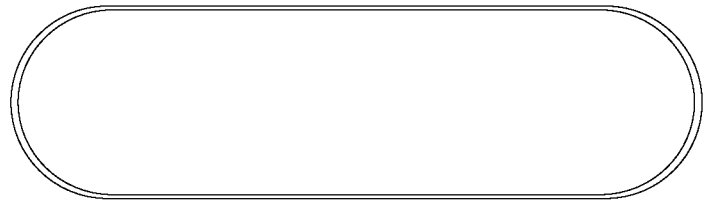
Figure 8:
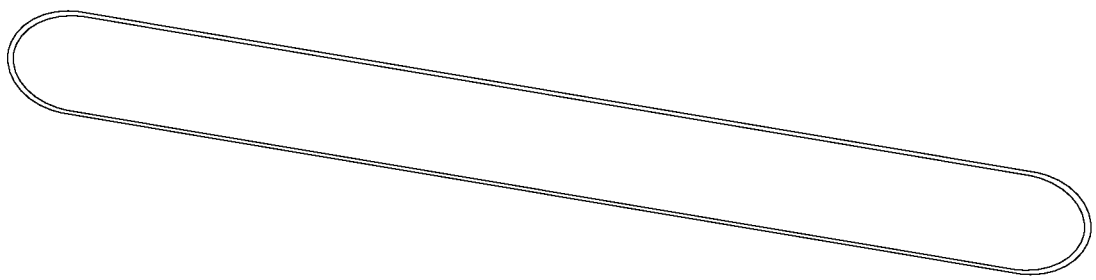

As used herein, concentrations are expressed as a percentage based on weight of solute and weight of solvent (wt %).

As used herein a liquid product is a flowable product that may have a viscosity of up to 70,000 cps. As such the term liquid is intended to encompass both low viscosity products such as water and higher viscosity products such as pastes, slurries, suspensions, creams and sauces. As used herein, viscosity is typically as measured at room temperature (e.g. 20° C.). The viscosity of certain liquids may be dependent on shear rate (e.g. shear thinning fluids). The term liquid as used herein is intended to cover shear rate-independent fluids which have a viscosity of up to 70,000 cps as well as shear thinning fluids which have a viscosity of up to 70,000 cps at a high shear rate (e.g. a shear rate of $10 \text{ s}^{-1}$ or $100 \text{ s}^{-1}$). Where viscosities of liquid products are discussed herein, the values mentioned are to be interpreted as viscosity at a high shear rate (e.g. a shear rate of $10 \text{ s}^{-1}$ or $100 \text{ s}^{-1}$) when applied to shear thinning fluids.

As used herein the term substantially liquid-tight is intended to describe a seal which is capable of preventing substantially all liquid from permeating through said seal. Thus, the amount of encapsulated product which is able to escape through a substantially liquid tight seal over a 1 hour period after formation of the seal may be 10% or less (e.g. 5% or less, 2% or less, or 1% or less) of the amount of product which was originally encapsulated. The amount of product able to escape through the seal is distinct from the amount of product ale to permeate through the membrane. Escape of product through the seal is attributable to the mechanical integrity of the seal, whereas permeation of product through the membrane is attributable to the permeability characteristics of the membrane material itself.

Usefully, the process of the invention results in a membrane which acts as a water insoluble capsule and packaging material which, upon sealing, surrounds the product and securely stores or holds it. In embodiments where the product is a liquid, a substantially liquid-tight (e.g. substantially water-tight) seal is formed, thereby encapsulating the liquid product. This represents a particular advantage over techniques for encapsulation of non-liquid products. Techniques which are intended for encapsulating non-liquid products do not address the problem of how to create a substantially liquid tight seal.

For this purpose, mechanical properties of alginate hydrogels must be sufficient to maintain physical integrity and sustain high loads without breaking or forming defects. However, said encapsulation membrane remains biodegradable and/or edible and thus is environmentally and/or biologically friendly.

Advantageously, alginate cross-linked membranes created and applied in this process can therefore be used in a novel way to provide an environmentally friendly and biologically acceptable alternative to conventional materials (e.g. glass and plastics) for the storage and transportation of different products, particularly those that are liquid based and/or are subject to or require specific temperatures.

The method of the present invention has the advantage that it can be used to encapsulate a larger volume of product (e.g. liquid product) than in culinary spherification techniques. In spherification techniques the product to be encapsulated may first be provided in droplet form, and then immersed in a medium which results in the formation of a membrane at the interface between the droplet and the surrounding medium. The volume of the encapsulated product is therefore limited to the maximum single droplet size that can be created. In the process of the present invention, the water insoluble membrane is provided which may then be filled with the product. In this way the water insoluble membrane may be filled with bulk product and the volume of the encapsulated product is not limited by the maximum single droplet size that can be created.

Such encapsulated products may include liquid products such as water, milk, alcohol, other beverage types having a variety of temperatures, sauce, oil, confectionary formulas, baby formula or feeds and edible colloids including yogurt, cream cheese. Other products may be of the non edible variety and include liquids such as cosmetics, soap, shampoo, toners or cream. Finally, the invention may also be used to package products in powder form, such as salt, sugar, pepper, tea, coffee.

In some embodiments the product is a liquid product, for example a liquid product having a viscosity of 70,000 cps or less. In some embodiments the liquid product has a viscosity of 20,000 cps or less, e.g. 15,000 cps or less, typically 15,000 cps or less, preferably 10,000 cps or less and more preferably 5,000 cps or less. Non-limiting examples of liquid products include water, soft drinks, alcoholic drinks, liquid condiments and sauces such as ketchups, mustards, mayonnaise etc.

Advantageously, the mixture (i.e. the blend comprising alginate and thickener which is extruded to form the membrane) may be blended at room temperature so no special environmental conditions, requiring further expense are required, making the process economical.

Usefully, the mixture forms a viscous paste which is able to be controlled and extruded with care. A range of viscosities can be produced (e.g. 5,000 cps to 250,000 cps or 50,000-1,000,000 cps) to provide an optimum membrane for processing. The paste is preferably shear thinning and has a viscosity of 700,000 to 900,000 cps, e.g. about 800,000 cps at $2.5 \text{ s}^{-1}$ shear rate As a result of the shape of the die, which may be a substantially annular, each insoluble membrane pocket may have the characteristic shape of a rounded pillow or tetrahedron. However, the invention is not limited to a particular shape.

In a further embodiment, the process comprises the further step of: pinching the encapsulation membrane at predetermined intervals there along to individually seal a plurality of liquid-based products. While crosslinking propagates through the thickness of the membrane, a mechanical device may be used to pinch the membrane to seal it. Such a device may therefore seal the membrane at predetermined points or regular intervals in order to define a series of pockets, each comprising a product, encapsulated in a water insoluble package. In some embodiments the inner surface of the membrane may be partially cross linked (i.e. may not be fully cross-linked) when pinched, since the calcium solution takes a period of time to fully diffuse through the membrane and finish crosslinking the alginate. This process will therefore help ensure that each seal adjacent each pocket is substantially liquid-tight (e.g. completely water-tight).

Thus, in some such embodiments, the process of the present invention comprises:
blending together an alginate and a thickener and extruding through an appropriately shaped die to form a membrane;
applying a calcium rich ion solution to crosslink the membrane and create a water insoluble membrane;

pinching the membrane (e.g. with a mechanical device) while crosslinking propagates through the thickness of the membrane to create a pocket with a first substantially liquid tight (e.g. completely water-tight) seal;

filling the pocket with the product (e.g. liquid product); and pinching the membrane (e.g. with a mechanical device) while crosslinking propagates through the thickness of the membrane to form a second substantially liquid tight (e.g. completely water-tight) seal (e.g. at a predetermined interval from the first substantially liquid-tight seal), encapsulating the product (e.g. liquid product) therein. The pinching is typically applied to a first pair of surfaces of the membrane, so as to bring into contact a second pair of surfaces of the membrane, each of the second pair of surfaces being disposed on the opposite side of the membrane from each of the first pair of surfaces. Each of the first pair of surfaces is typically on a side of the membrane which has been exposed to the calcium rich ion solution. Each of the second pair of surfaces is typically on a side of the membrane which has not been substantially exposed to the calcium rich ion solution. Pinching is typically initiated before each of the second pair of surfaces has been crosslinked.

In some embodiments pinching is maintained for a period of time sufficient for calcium ions to diffuse through the thickness of the membrane and effect crosslinking at the second pair of surfaces. In such embodiments at least some degree of crosslinking typically takes place at the second pair of surfaces while the second pair of surfaces are in contact with each other.

Advantageously, the newly formed series or string of closed containers or pockets can then be cut at each seal, or at regular intervals along the series to form a chain allowing consumers to transport several units at once. In a preferred embodiment of the invention the process therefore further comprises the step of cutting along the seal to isolate an encapsulated product or cutting along a seal at a predefine interval to produce a chain or series of linked encapsulated products.

Thus, in some embodiments, the process of the present invention further comprises a step of cutting the membrane at a seal to form a cut edge. In some embodiments the cut is made once crosslinking is substantially complete. In other embodiments the cut is made before crosslinking is substantially complete.

In embodiments where the cut is made before crosslinking is substantially complete it is typically made while the seal is pinched (e.g. with a mechanical device), and preferably while the seal is pinched on either side of the point at which the cut is made. Preferably, in such embodiments, the cut edge is exposed to a calcium ion rich solution after the cut is made (e.g. within 10 seconds after the cut is made, typically within 5 seconds after the cut is made, preferably within 3 seconds after the cut is made, more preferably within 1 second after the cut is made). The die through which the blend of alginate and thickener is extruded may have any appropriate shape, for example any shape of closed loop. The loop may for example be annular, oval, square or rectangular. The die may have a shape capable of extruding the membrane to form a tube or tube-like shape.

The die may form part of an extruder head. The extruder head may comprise a plurality of inlets. For example, the extruder head may comprise an first inlet for extruding the blend of alginate and thickener and a second extruder head for dispensing the product. The second extruder head may be within a closed loop-shaped die forming the first inlet.

The orientation of pinches can be controlled in order to produce encapsulated products having a particular shape. The following shapes can be formed using the following configuration of pinches:

Pillow shape: Parallel flat pinches

Tetrahedral: consecutive parallel flat pinches angled at 90 degrees to each other Round: Closing iris diaphragm, or rotating extrusion head Drop shaped: Time controlled iris diaphragm Moulded pillow: parallel flat pinches with mould applied therebetween to create a moulded shape and/or texture on surface of the pillow.

The container or series thereof may then be rinsed and dried.

In some embodiments, a solution of 1-10% alginate is utilised (i.e. the concentration of alginate in the solution is 1-10 wt %).

In some embodiments, the thickener is preferably xanthan or cellulose gum but could equally be native starch, modified starch, cellulose gel, guar gum, tara gum, carrageenan, gum tragacanth, locust bean gum, microcrystalline cellulose, pectin, gellan gum, glucumannans, succino-glucan and mixtures thereof.

In some embodiments, the mixture is blended with a plasticising additive in order to increase plasticity prior to extrusion. Such additives may include glycerol or sodium stearate, agar, carrageenan or pectin.

In certain embodiments, additional stabilisers or other compounds for increasing plasticity can be used. These may include one or more selection from 1,3-butylene glycol, acacia, acetic and fatty acid esters of glycerol, acetone, acetylated distarch adipate, acetylated monoglycerides, acid-treated starch, agar, alginic acid, alkaline-treated starch, anoxomer, ascorbic acid, ascorbyl palmitate, ascorbyl stearate, azodicarbonamide, beeswax, bleached starch, bone phosphate, brominated vegetable oil, calcium acetate, calcium alginate, calcium aluminum silicate, calcium ascorbate, calcium benzoate, calcium bromate, calcium carbonates, calcium chloride, calcium citrate, calcium dihydrogen phosphate, calcium disodium ethylenediamine-tetraacetate, calcium DL-malate, calcium ferrocyanide, calcium gluconate, calcium hydrogen sulfite, calcium hydroxide, calcium iodate, calcium lactate, calcium lactate gluconate, calcium lactobionate, calcium peroxide, calcium phosphate, calcium polyphosphates, calcium propionate, calcium pyrophosphatecalcium salts of fatty acids, calcium silicate, calcium sorbate, calcium stearate, calcium stearoyl lactylate, calcium sulfate, calcium tartrate, calciumiodiate, candelilla wax, carbamide, carbon dioxide, carnauba wax, carob bean gum, carrageenan, castor oil, cellulose gum, celluloses, choline salts and esters, citric acid, citric and fatty acid esters of glycerol, crosslinked sodium carboxymethylcellulose, cupric sulfate, D-alpha-tocopherol, dammar gum, decanoic acid, dedesoxycholic acid, dedextrins, dextrin ethyl cellulose, dextrose, diacetyltartaric acid esters of mono- and diglycerides of fatty acids, diammonium hydrogen phosphate, dicalcium pyrophosphate, diethyl pyrocarbonate, ethyl alcohol, ethyl cellulose, ethyl hydroxyethyl cellulose, ethyl p-hydroxybenzoate, ethyl protocatechuate, ethylene dichloride, esters of glycerol and thermally oxidized soy bean fatty acids, ethoxylated mono- and diglycerides, ethyl hydroxyethyl cellulose, formic acid, gellan gum, gelatin, genipin, gibberellic acid, glucono delta-lactone, glycerin, glycerol, glycerol ester of wood rosin, guaiac resin, guar gum, gum acacia, gum arabic, gum ghatti, gum guaiac, heptylparaben, peroxide derivatives, hydrogen peroxide, hydroxylated lecithin, hydroxypropyl cellulose, hydroxypropyl distarch.

In some embodiments the components of the mixture (i.e. in the blend comprising alginate and thickener which is extruded to form the membrane) are selected to have neutral odour ad/or taste. Using a mixture with neutral taste and/or odour may have the advantage of avoiding taste contamination of the product once encapsulated.

In some embodiments the concentration of calcium in the mixture (i.e. in the blend comprising alginate and thickener which is extruded to form the membrane) is 0.02% or less. In some embodiments the blend comprising alginate and thickener which is extruded to form the membrane is substantially free of calcium. In some embodiments the blend is free of calcium.

In some embodiments the concentration of protein in the mixture (i.e. in the blend comprising alginate and thickener which is extruded to form the membrane) is 2% or less. In some embodiments the blend comprising alginate and thickener which is extruded to form the membrane is substantially free of protein. In some embodiments the blend is free of protein.

In some preferred embodiments, the process is undertaken using a vacuum blender. This may help avoid the creation of air bubbles, which cause imperfections in the formation of the product membrane.

In some embodiments the solution of calcium ions (i.e. the calcium ion rich solution) has a concentration of 1 to 10% (i.e. a concentration of calcium ions of 1 to 10 wt %). Such a concentration may help efficient cross-linking of the alginate, while it is still fragile. In preferred embodiments, the calcium ion solution is applied by spraying; the preferred spraying rate may be in the range of 1 mL-50 mL/sec. Optionally an additional pre step of treating the product with a solution of 0.5 to 10% calcium ions prior to filling the membrane with the product may be undertaken. However such a step is not essential and the process of the invention preferably does not include pre-treatment of the product with a solution of calcium ions or other divalent metal ions.

In certain preferred embodiments the solution of calcium ions in the calcium ion rich solution is 5 wt % or less, more preferably 2.5 wt % or less. Using solutions with calcium ion concentrations in these ranges may advantageously avoid any detectable change in the taste of the product once encapsulated. In certain embodiments, the encapsulated product has a residual calcium ion concentration of 250 ppm or less.

Advantageously, several further optional steps maybe undertaken to improve the different characteristics of the water insoluble membrane: in embodiments such steps may be separately incorporated into a method of the invention or may be utilised in any combination:

An optional reinforcement step may be undertaken in which the encapsulated product is heated at 40 degrees C. or higher. Advantageously, such a step may result in a denser matrix with increased mechanical strength, appearance and reduced permeability once the product is formed.

In such a step, the reinforcing process may further include a step of compressing the capsule in a mould under a load of more than 100N. Usefully, this may further improve the density of the crosslinking matrix providing an increased mechanical strength.

In a particularly preferred embodiment, the process may comprise a further step of applying a secondary layer to the membrane of the encapsulated product. Such a layer may be a further alginate layer or other suitable hydrogel or protective layer which is peelable or otherwise removable from the product but provides further hygienic protection to the encapsulated product. Such a layer would be similar to that of a fruit skin and designed to allow the consumer to remove it from the product as required.

The exterior of the encapsulated product, comprising alginate cross-linked membrane, whether it comprises a further secondary layer or not, may be a useful substrate to which edible ink or imagery may be applied in the form of text, pictures or logos. Text of a logo can be printed or applied for marketing purposes or hidden and introduced between two layers in the case of a secondary membrane.

In some embodiments the membrane is extruded at an angle to the horizontal. For example, the membrane may be extruded at an angle of 30 degrees or more to the horizontal, 40 degrees or more to the horizontal, 50 degrees or more to the horizontal, 60 degrees or more to the horizontal, 70 degrees or more to the horizontal or 80 degrees or more to the horizontal. In some embodiments the membrane is extruded at a substantially vertical angle. Extruding the membrane at an angle to the horizontal may aid filling of the membrane with a liquid product, creation of extrudates with large dimensions (e.g. an annular extrudate with a diameter of 38 mm or more) and/or creation of encapsulated products having a variety of shapes (including but not limited to the shapes described above).

The process of the present invention may comprise controlling the air pressure within the membrane. For example, air pressure within the membrane may be controlled during or after filling of the membrane with the product, and before sealing of the membrane around the product. Controlling the air pressure in this way enables the membrane to be stretched before sealing of the membrane, so that the dimensions of the product once encapsulated are larger than (e.g. up to 50% larger than) the dimensions of the extrusion die. Air pressure can be controlled by including an air inlet in the extruder head. The air inlet may be located within a closed loop-shaped extrusion die The invention will now be described by way of the following non-limiting examples.

The skilled person will envisage that features which are optional can be used in different combinations to construct various different embodiments and examples of the invention not limited to the processes provided. Such methods for encapsulating liquids or colloids in an alginate membrane could follow the examples below.

Example 1: Basic Single or Multiple Unit Production

A viscous paste is prepared by mixing 1-10% alginate and a 1-10% of thickener such as xanthan, guar or cellulose gum, other additives as glycerol or sodium stearate may be added in order to increase plasticity.

The paste is typically blended at room temperature in a vacuum chopper to ensure no air bubbles are present as they would create imperfections. A range of viscosity can be produced (50,000-1,000,000 cps).

A tube is then formed by extrusion: The paste is extruded through a ring shaped die while the beverage to be encapsulated is filled inside the tube being created. The operation may be performed at room temperature.

The newly formed tube is immediately sprayed by a calcium rich solution, which starts crosslinking the tube from the outside. A solution of 1 to 10% calcium ions ensures fast cross-linking of the alginate tube while it is still fragile. Spraying rate is in the range of 1 mL-50 mL/sec.

The crosslinking progresses through the thickness of the tube and as the tube is formed and pushed further out of the extrusion head, a mechanical device may pinch the tube at regular intervals to form defined filled containers or units. As the inner surface of the tube is still not completely cross-linked at the time of pinching, the calcium ions will continue to diffuse through the membrane thereafter such that each unit is cross-linked and sealed at the pinch points and therefore is completely water tight. In this example, the formed container has the characteristic shape of a pillow.

The pinch process might incorporate application of a tag member which, as the unit is pinched simultaneously transfers a tag into the membrane before the membrane is completely crosslinked. However, it is possible to add tag or pull member by a separate process, which is independent from the pinching, provided the member is added before the cross linking is complete to ensure the sealing process is not impaired.

After the crosslinking is complete, a portion of the tag member remains inherently embedded therein and is tightly sealed there around; whereas another part remains protruding from the unit. For example, the protruding part or portion may be a flap which lies substantially flat against the surface of the membrane but which could be manually raised by the user to pull the tag away from the surface. This action enables the user, at a suitable time, to break the membrane to create a slit or aperture and allow the contents to be removed when desired with ease, e.g. by subsequently squeezing or pouring the liquid through the aperture.

Figure 9:
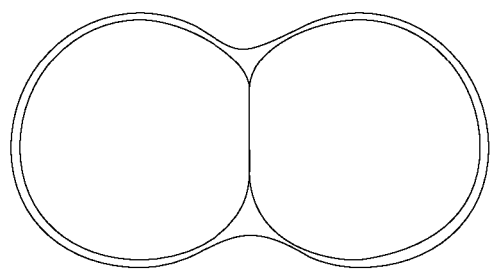
FIG. 9 shows an alternative a double unit package made in accordance with an embodiment of the invention, in which the secondary membrane or layer comprises two individual or single units as described in FIG. 1.
Figure 10:
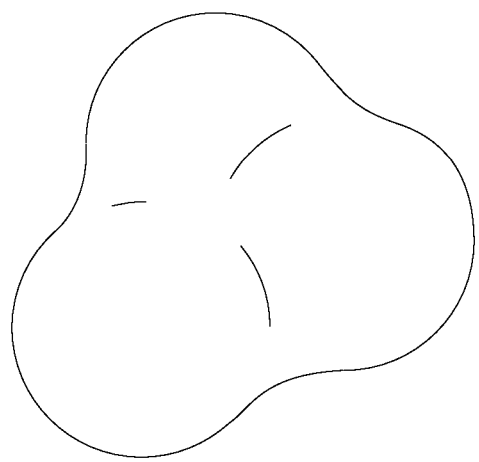
FIG. 10 shows a triple unit version of FIG. 9.
Figure 11:
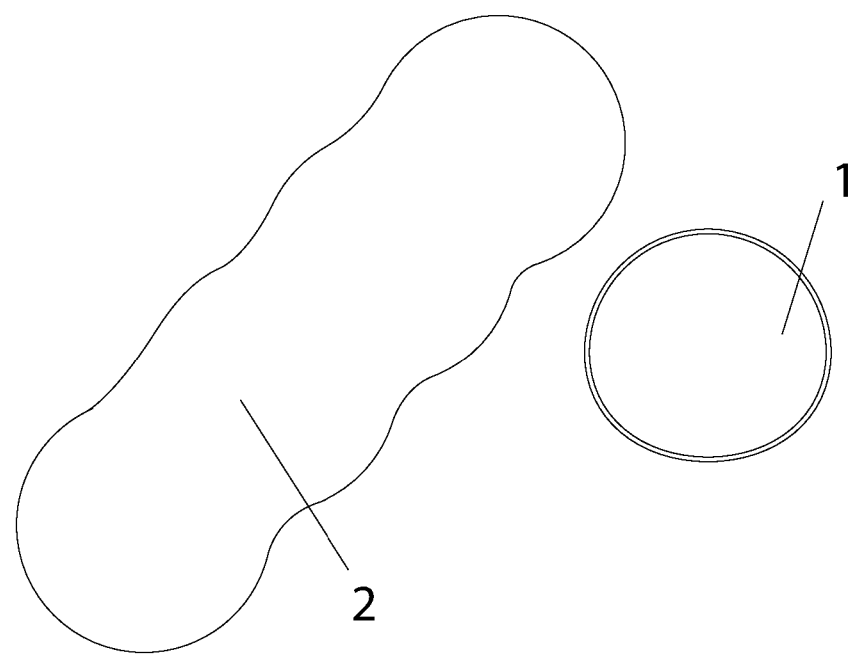
FIG. 11 shows a multiple unit version of FIG. 9.
Figure 12:
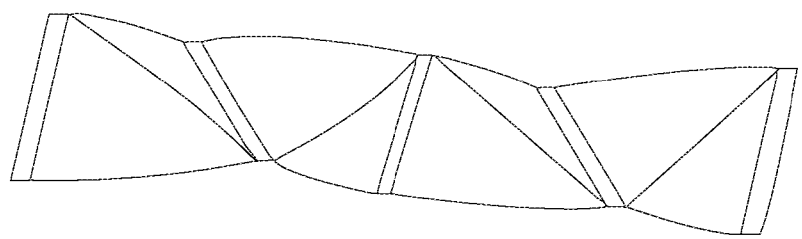
FIG. 12 shows a chain of multiple units of coextruded alginate membrane unit as shown in FIG. 4, with cross-linked joins in a non-parallel configuration.

As the pinch process is repeated along the tube a string of closed containers each unit can be cut at the seal to produce individual units, or a chain or two or more units can be retained together and cut at seals on end of the desired length of chain such that the package comprises and thus is able to transports several filled units at once as shown and described in FIG. 1, 9, 10 or 11.

The units/containers are then rinsed and dried. A series of post processes can be applied to improve appearance.

Example 2: Indexing Machine with Iris Diaphragm

A viscous paste is prepared as described in Example 1 and extruded to form a tube by extrusion where the paste is extruded through a ring shaped die while the beverage is filled inside the tube being created. As described previously, the newly formed tube is immediately sprayed by a calcium rich solution, which starts crosslinking the tube from the outside.

As the formed pocket fills up, it enters a special pinching embodiment that is an iris shaped diaphragm. As the iris closes on the tube it contacts the inner wall of the membrane and holds it closed until full crosslinking has been achieved. A specific version of the pinching mechanism is mounted on a rail so that the iris can move in the direction of the extrusion while the tube gets filled so that it doesn't block the formation of the next unit. After a period of time sufficient to form a water tight seal, the iris can reopen and move back to its initial position to start a new cycle.

Example 3

A viscous paste is prepared as described in Example 1 and extruded to form a tube by extrusion where the paste is extruded through a rotating ring shaped die while the beverage is filled inside the tube being created. As described previously, the newly formed tube is immediately sprayed by a calcium rich solution, which starts crosslinking the tube from the outside.

A V-shaped mechanical device may be used to pinch the tube at regular intervals to force it to twist and form defined containers. A fixed conveyor belt may be used to stop and start the rotation of the formed tube, to create the seal. The rotation speed is typically in the range of 60-360 rpm. The formed container or unit has the characteristic shape of a rounded cylinder.

Example 4: Additional Layer

In certain applications the alginate container or unit may preferably have a secondary layer in order to create a peelable or removable layer to enhance the packaging mechanical strength and provide an additional pathogen barrier to the content.

Such a further layer can be created by using thick or viscous solution of 1-10% of sodium alginate, typically 2%, with a viscosity in the range of at least 50-5000 cps. In other examples, the thick solution may instead be composed of 1-10% of cellulose gum or xantam gum.

It is possible to add a colorant to this layer to allow the user to identify the layer as an outer layer or otherwise differentiate from the inner layer for removal.

Once the solution is homogeneous and no air bubbles remain, the previously formed alginate container, for example as made in accordance with examples 1 or 2, is dipped or otherwise coated with the solution.

It is then extracted from the solution and the excess is drained, forming a homogeneously thicker layer of solution upon the surface of the container membrane. The concentration of alginate and the time left for dripping can be altered in order to define the thickness of the secondary layer.

The container is then submerged in a bath of 1 to 10% Calcium ions, typically calcium chloride at 2%, and allowed to crosslink for 1 to 30 min and removed. The calcium ions may be applied by other means such as spraying. The container is then allowed to dry or a drying process applied to speed up this part of the method.

This may be done with a segmented conveyor belt that submerge the container in the alginate bath, then extracts it and removes excess, and then drops it in a calcium bath.

The process of layering can be repeated as multiple times to increase the mechanical resistance and reduce the permeability of container.

In some embodiments, a tag or pull may be inserted or embedded into the secondary layer during formation such that at least a portion protrudes from the outer layer to enable a user to break, tear or open the secondary layer with ease and access the container or unit without inherently breaking it at the same time Example 4: Grouped Units or Containers It might be preferable for certain applications that several alginate containers are grouped together within a secondary layer in order to create a peelable hygienic layer similar to that of a fruit skin, revealing individual sip size containers or compartments, like segments in an orange that can then be separated for use. Such groupings can be created with the following steps:

A thick solution of 1-10% of sodium alginate is prepared at room temperature, typically 2%, with a viscosity in the range of 50-5000 cps. Colorant can be added.

Once the solution is homogeneous and no air bubbles remain, the previously formed alginate containers are dipped in the solution, maintaining contact between them to agglomerate them in a group. They are then delicately extracted from the solution and excess solution is let to drip, forming a homogeneously thick layer of solution at the surface of the containers. The concentration of alginate and the time left for dripping define the thickness of the secondary layer.

The grouping is then submerged in a bath of 1 to 10% Calcium ions, typically calcium chloride at 2% and let to crosslink for 1-30 min. The grouping is then removed from the bath and dried before being ready to be used. The process can be repeated as many times as required to increase the mechanical resistance and reduce permeability of grouping.

Optional Processing Techniques
Temperature Hardening:

It is preferred for the membrane of the alginate containers to be dense and of low permeability in order to improve the packaging functionality. It is also important that their appearance is smooth and aesthetically pleasing.

Improving these properties is possible by forming the alginate containers, as provided in one of the previous examples, and submerging in heated water at a temperature above 80 degree C. The alginate containers remain in the water for 1-30 minutes, preferably 5-10 minutes. In preferred embodiments the water is gently stirred so that the alginate containers continue to rotate and are heated uniformly. The containers are extracted from the water, cooled and dried. The membrane of the container post treatment is denser, harder and shinier. The containers can then be further processed, as provided for in the accompanying examples.

Alternatively, the formed alginate containers may be compressed for up to 30 minutes by being placed under a load, e.g. a flat weighted surface of 100 g to 1000 g.

Branding/Identification:

In one embodiment the process of the invention permits a very useful labelling process for applying logos, branding or identification to a container. A single or double layer alginate container is created as described in one of the examples above. Usefully a logo may be applied, e.g. via sprayed onto the surface of the membrane using edible paint (ethyl alcohol and titanium dioxide food colouring) through a stencil. The coating can be applied in several layers. The membrane is then left to dry for 10 minutes at room temperature before being handled. Alternatively, a wet label made of edible paper, typically rice paper is placed on the surface of the alginate container. The water makes the label adhere well enough for the next step. The labelled/branded container can then be processed to create an additional layer as described in the examples above.

It is noteworthy that other mechanical properties such as stiffness, elasticity and swelling can be independently controlled in order to achieve a particular desired product characteristic and as such can be varied to provide yet further embodiments of the invention.

Tailor Made Alginates

Usefully, this can be attained by varying physical factors such as the cross-linking density, cross-linker type, polymer molecular weight (MW) and MW distribution, material composition as well as by chemical modification of the polymer (LeRoux, Guilak et al. 1999, Kong and Mooney 2003, Kong, Smith et al. 2003, Ratner 2004, Augst, Kong et al. 2006). In particular, to further enhance the mechanical and anti-leak properties of the alginate hydrogel, a blend of tailor-made alginates with desired properties can be used. For example, a combination of alginates with varying compositions of Guluronic acid blocks ('G-block') are observed to effect the crosslinking with metal ions such as $Ca^{2+}$ to form calcium alginate polymer networks (membranes) with desired properties.

An extension of these materials and a combination of formulas were tested in our study to systematically identify their effects on film formation. The alginate films investigated in this study are tailor made to meet the specificity for applications involving the sustained encapsulation of liquids and may be extended to the packaging of foodstuff and various products, provided these products do not contribute to the degradation of the films. Hence, the work presented here aims to utilise the tuneable properties of this biopolymer in an effort to obtain a strong yet ductile, low permeating and minimally porous material for use in the aforementioned applications.

Such products can be used as edible or biodegradable labels to add to the products of the invention or within the process steps of the method of the invention.

Various further aspects and embodiments of the present invention will be apparent to those skilled in the art in view of the present disclosure.

All documents mentioned in this specification are incorporated herein by reference in their entirety. "and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein. Unless context dictates otherwise, the descriptions and definitions of the features set out above are not limited to any particular aspect or embodiment of the invention and apply equally to all aspects and embodiments which are described. Various further aspects and embodiments of the present invention will be apparent to those skilled in the art in view of the present disclosure. While the invention has been described herein in reference to specific aspects, features and illustrative embodiments of the invention, it will be appreciated that the utility of the invention is not thus limited, but rather extends to and encompasses variations, modifications and alternative embodiments, as will be understood by those of ordinary skill in the field.

The invention claimed is:

1. A method for encapsulating a liquid product having a viscosity of less than 20000 cP (measured at 20° C. and a shear rate of 10 $s^{-1}$), the method comprising:
   blending together a solution of alginate and a thickener and extruding through an appropriately shaped die to form a membrane;
   applying a calcium rich ion solution to crosslink the membrane and create a water insoluble membrane;
   filling the water insoluble membrane with the liquid product having a viscosity of less than 20000 cP (measured at 20° C. and a shear rate of 10 $s^{-1}$); and
   sealing the membrane around the liquid product through a pinch process, encapsulating the liquid product therein, wherein
   the pinch process comprises pinching the membrane while crosslinking propagates through the membrane to provide a liquid-tight flat seal in the absence of heat.

2. The method of claim 1 wherein the blending occurs at room temperature.

3. The method of claim 1, wherein the pinch process further comprises: pinching the membrane at predetermined intervals therealong to individually seal and form a plurality of liquid-based products in series.

4. The method of claim 3, wherein the method further comprises:
   cutting at each seal to separate the products or cutting at predetermined intervals within the series to form distinct chains of encapsulated products.

5. The method of claim 1, wherein the encapsulated product is rinsed and dried.

6. The method of claim 1, wherein the solution of alginate is 1-10% alginate.

7. The method of claim 1, wherein the thickener is xanthan or cellulose gum.

8. The method of claim 1, wherein the solution of alginate and the thickener is blended with a further plasticizing additive.

9. The method of claim 1, wherein the calcium rich ion solution has a concentration of 1 to 10%.

10. The method of claim 1, further comprising an additional pre-step of treating the product with a solution of 0.5 to 10% calcium ions, prior to filling the membrane with the product.

11. The method of claim 1, further comprising undertaking a membrane reinforcement step in which the encapsulated product is heated to at least 40 degrees C.

12. The method of claim 1, further comprising undertaking a membrane reinforcement step in which the encapsulated product is heated to at least 80 degrees C.

13. The method of claim 1, further comprising undertaking a membrane reinforcement step in which the encapsulated product is compressed under a load of 100N or more.

14. The method of claim 1, further comprising the step of applying a brand, identification or label onto the membrane.

15. The method of claim 1, wherein the method further comprises:
   applying a secondary temporary layer to the membrane of the encapsulated product.

16. The method of claim 15, wherein the secondary layer is a cross-linked alginate membrane.

17. The method of claim 15 wherein the membrane and the secondary layer are distinguishable from one another by a preformed label or color applied to the membrane and/or to the secondary layer.

* * * * *